US011376813B2

(12) United States Patent
Carlson

(10) Patent No.: US 11,376,813 B2
(45) Date of Patent: Jul. 5, 2022

(54) COMPOSITE ARTICLE AND RELATED METHODS

(71) Applicant: ND Industries, Inc., Clawson, MI (US)

(72) Inventor: David Carlson, Rochester Hills, MI (US)

(73) Assignee: ND INDUSTRIES, INC., Clawson, MI (US)

( * ) Notice: Subject to any disclaimer, the term of this patent is extended or adjusted under 35 U.S.C. 154(b) by 0 days.

(21) Appl. No.: 15/988,127

(22) Filed: May 24, 2018

(65) Prior Publication Data

US 2018/0339489 A1    Nov. 29, 2018

Related U.S. Application Data

(60) Provisional application No. 62/511,109, filed on May 25, 2017.

(51) Int. Cl.
| | | |
|---|---|---|
| B32B 5/20 | (2006.01) | |
| B29C 44/34 | (2006.01) | |
| C08J 9/00 | (2006.01) | |
| C08J 9/10 | (2006.01) | |
| C09J 123/08 | (2006.01) | |
| C08J 9/06 | (2006.01) | |
| B32B 15/04 | (2006.01) | |
| C08J 3/20 | (2006.01) | |
| C08K 3/04 | (2006.01) | |
| C08K 3/26 | (2006.01) | |
| C08K 5/3415 | (2006.01) | |
| B29K 23/00 | (2006.01) | |
| B29K 105/00 | (2006.01) | |
| B29C 44/50 | (2006.01) | |

(52) U.S. Cl.
CPC ............ *B32B 5/20* (2013.01); *B29C 44/3484* (2013.01); *B32B 15/046* (2013.01); *C08J 3/20* (2013.01); *C08J 9/0061* (2013.01); *C08J 9/0066* (2013.01); *C08J 9/06* (2013.01); *C08J 9/102* (2013.01); *C08J 9/104* (2013.01); *C08J 9/107* (2013.01); *C08K 3/04* (2013.01); *C08K 3/26* (2013.01); *C08K 5/3415* (2013.01); *C09J 123/0869* (2013.01); *B29C 44/507* (2016.11); *B29K 2023/06* (2013.01); *B29K 2023/12* (2013.01); *B29K 2023/18* (2013.01); *B29K 2105/0005* (2013.01); *B29K 2105/0085* (2013.01); *B32B 2305/022* (2013.01); *B32B 2305/30* (2013.01); *B32B 2305/72* (2013.01); *B32B 2323/04* (2013.01); *B32B 2581/00* (2013.01); *C08J 2201/026* (2013.01); *C08J 2203/02* (2013.01); *C08J 2203/04* (2013.01); *C08J 2207/02* (2013.01); *C08J 2323/02* (2013.01); *C08J 2323/08* (2013.01); *C08J 2400/22* (2013.01); *C08J 2423/08* (2013.01); *C08K 2003/265* (2013.01); *C08L 2205/025* (2013.01); *C08L 2312/00* (2013.01)

(58) Field of Classification Search
CPC ........ B32B 5/20; B32B 15/046; C08J 9/0066; C08J 9/0061; C08K 3/04; C08K 3/26
See application file for complete search history.

(56) References Cited

U.S. PATENT DOCUMENTS

| | | | |
|---|---|---|---|
| 5,266,133 A * | 11/1993 | Hanley | ................... B60R 13/08 156/71 |
| 5,426,130 A | 6/1995 | Thurber et al. | |
| 5,651,824 A | 7/1997 | Wallace et al. | |
| 5,656,325 A | 8/1997 | Wallace | |
| 5,672,376 A | 9/1997 | Wallace | |
| 5,679,160 A | 10/1997 | Wallace et al. | |
| 5,928,711 A | 7/1999 | Wallace et al. | |
| 5,964,551 A | 10/1999 | Wallace | |
| 6,027,568 A | 2/2000 | Wallace et al. | |
| 6,270,838 B1 | 8/2001 | Wallace et al. | |
| 6,322,628 B1 | 11/2001 | Wallace | |
| 6,474,919 B2 | 11/2002 | Wallace et al. | |
| 6,817,816 B2 | 11/2004 | Hill | |
| 6,830,799 B1 | 12/2004 | Duffin et al. | |

(Continued)

FOREIGN PATENT DOCUMENTS

| | | | |
|---|---|---|---|
| EP | 1557453 A2 | 7/2005 | |
| EP | 1921121 A1 | 5/2008 | |

(Continued)

OTHER PUBLICATIONS

PCT/US2018/034287 International Search Report dated Jul. 18, 2018, 4 pages.

*Primary Examiner* — Hai Vo

(74) *Attorney, Agent, or Firm* — Warner Norcross + Judd LLP

(57) ABSTRACT

A composite article comprises an article presenting a surface and a thermally expandable composition disposed on the surface of the article. The thermally expandable composition comprises (a) from about 35 to about 65 percent by weight of a polyolefin resin; (b) from about 2 to about 15 percent by weight of a thermoplastic resin; (c) from about 1 to about 6 percent by weight of a curing agent suitable for cross-linking the polyolefin resin (a); (d) from about 15 to about 45 percent by weight of filler; and (e) from about 1 to about 10 percent by weight of a chemical blowing agent which is activated at an activation temperature, each based on the total weight of the thermally expandable composition. Methods of preparing and using the composite article, and an assembly formed from the composite article, are also disclosed.

8 Claims, No Drawings

(56) References Cited

U.S. PATENT DOCUMENTS

| | | |
|---|---|---|
| 7,404,483 B2 | 7/2008 | Wallace |
| 7,521,402 B2 | 4/2009 | Combetta |
| 7,771,148 B2 | 8/2010 | Phillips |
| 7,772,316 B2 | 8/2010 | Barr |
| 7,878,744 B2 | 2/2011 | Snow et al. |
| 8,865,794 B2 | 10/2014 | Wallace et al. |
| 8,865,812 B2 | 10/2014 | Phillips |
| 2006/0160932 A1* | 7/2006 | Taylor ............... C08G 59/4207 523/458 |
| 2007/0249743 A1* | 10/2007 | Sehanobish ............. B29C 44/12 521/134 |
| 2007/0265364 A1* | 11/2007 | Oner-Deliomanli ..... C08J 9/365 521/134 |
| 2008/0265516 A1* | 10/2008 | Walker ................. B29C 44/188 277/316 |
| 2008/0292426 A1 | 11/2008 | Snow et al. |
| 2014/0131910 A1* | 5/2014 | Kohlstrung ............. C08J 9/105 264/54 |
| 2014/0199135 A1 | 7/2014 | Hable et al. |
| 2015/0014126 A1 | 1/2015 | Snow |
| 2015/0056394 A1 | 2/2015 | Rawls |
| 2015/0232692 A1 | 8/2015 | Snyder et al. |

FOREIGN PATENT DOCUMENTS

| | | |
|---|---|---|
| WO | WO99/66219 A1 | 12/1999 |
| WO | WO2008/073262 A1 | 6/2008 |
| WO | WO2008/094535 A1 | 8/2008 |
| WO | WO2008/094537 A2 | 8/2008 |
| WO | WO2008/153866 A1 | 12/2008 |
| WO | WO2008/153868 A1 | 12/2008 |
| WO | WO2016028947 A1 | 2/2016 |

\* cited by examiner

COMPOSITE ARTICLE AND RELATED METHODS

CROSS-REFERENCE TO RELATED APPLICATIONS

This application claims priority to and all advantages of U.S. Provisional Application No. 62/511,109 filed on 25 May 2017, the content of which is hereby incorporated by reference.

FIELD OF THE INVENTION

The disclosure relates to a composite article and, more specifically, to a composite article including a thermally expandable composition, to a method of preparing and using the composite article, and to an assembly formed in accordance with the method.

DESCRIPTION OF THE RELATED ART

Adhesive and sealant compositions are known in the art and utilized in a variety of industries. For example, adhesives are commonly utilized to bond (or adhere) two adjacent layers or substrates to one another. Sealants are typically utilized to prevent passage of fluid or gas in various gaps or apertures that may exist in structural components. There are a variety of different types of adhesives and sealants based on desired physical properties, the end use of the adhesive, and materials of the substrates to be joined.

One type of sealant is an expandable polyurethane foam. Such expandable polyurethane foams may be sprayed into place, after which the expandable polyurethane foams expand to give a seal. However, expandable polyurethane foams are typically thermosetting materials and are applied in "spray-in-place" applications.

SUMMARY OF THE INVENTION

The present invention provides a composite article. The composite article includes an article presenting a surface, and a thermally expandable composition disposed on the surface of the article. The thermally expandable composition comprises (a) from about 35 to about 65 percent by weight of a polyolefin resin; (b) from about 2 to about 15 percent by weight of a thermoplastic resin; (c) from about 1 to about 6 percent by weight of a curing agent suitable for cross-linking the polyolefin resin (a); (d) from about 15 to about 45 percent by weight of filler; and (e) from about 1 to about 10 percent by weight of a chemical blowing agent, each based on the total weight of the thermally expandable composition. The (e) chemical blowing agent is activated at an activation temperature.

The present invention also provides a method of preparing the composite article. The method comprises thermoforming the thermally expandable composition at a first elevated temperature less than the activation temperature of the chemical blowing agent. The method further comprises disposing the thermally expandable composition onto the surface of the article to give the composite article.

The present invention additionally provides a method of adjoining adjacent elements with the composite article. The method comprises disposing the composite article adjacent and/or through the adjacent elements. The method further comprises heating the composite article at the activation temperature of the chemical blowing agent, thereby expanding the thermally expandable composition and adjoining the adjacent elements.

The present invention further provides an assembly formed in accordance with the method of adjoining adjacent elements with the composite article.

DETAILED DESCRIPTION

The present invention provides a composite article, a method of preparing the composite article (i.e., "method of manufacture"), a method of adjoining adjacent elements with the composite article (i.e., "method of use"), and an assembly formed in accordance with the method of adjoining adjacent elements with the composite article. The composite article is described immediately below, followed by a description of the method of manufacturing the composite article, the method of using the composite article, and the assembly formed in accordance with the method of using the composite article. However, the composite article of the present invention is not limited to a particular method of manufacture or use.

The composite article includes an article presenting a surface. The article is not limited and may be any article presenting a surface. Accordingly, the article may be of any configuration, size, dimension, shape, or combination of shapes. Likewise, the article may comprise any particular portion of a component, such as a head, shank, shoulder, body, and the like, or combinations thereof. Furthermore, the article may be formed from any conventional material(s), such as metal, wood, plastic, ceramic, glass, and the like, or combinations thereof. Typically, the article comprises metal. The metal may be any metal suitable for use in an article, and is typically selected to provide the article with strength, rigidity, and/or durability. Specific examples of suitable metals include iron, brass, bronze, titanium, aluminum, magnesium, tungsten, molybdenum, manganese, chromium, nickel, and the like, or a combination or alloy thereof. In some embodiments, the metal is an alloy. Examples of suitable alloys include steels, such as carbon steels, alloy steels, stainless steels, and the like, and combinations thereof.

The article may further include a conventional plating and/or coating, such as those coatings selected to prevent corrosion and/or aid in installation of the article. Specific examples of suitable conventional plating/coatings include zinc plating (e.g. galvanization), chromium (or chrome) plating, nickel plating, cadmium plating, aluminum plating, phosphate (e.g. dry phosphate) coating, and combination thereof. In certain embodiments, the article is formed from one type of metal and further comprises a conventional plating and/or coating comprising another type of metal. Alternatively, the article may be a "virgin" or "bright" article (i.e., it may lack plating/coating).

The surface of the article may be external (i.e., male) or internal (i.e., female), and is typically located on an exterior of the article. The surface may be of any type, configuration, or pattern. As such, any portion of the surface may be flat, contoured, smooth, rough, threaded, and/or the like, depending on the configuration of the article. However, the surface of the article is not limited to, for example, a threaded surface, nor to any particular major diameter, minor diameter, pitch diameter, helix angle, thread angle, thread count, thread pitch, or number of crests/roots. It is to be appreciated that the surface of the article may comprise the conventional plating and/or coating, if any, or may be free from, alternatively substantially free from, the conventional plating and/or coating.

In some embodiments, the article is a fastener and thus the composite article may be a composite fastener. The fastener is not limited and may be selected from any conventional fasteners understood in the art, and the description above is also relevant to the embodiments in which the article is a fastener. Examples of suitable fasteners include standard fasteners characterized by any of the ASTM, SAE, and/or ISO grades/classes of fasteners. The fastener may include a fastener head and/or shank. Likewise, the surface of the fastener may be threaded, or may include a threaded portion. Suitable fasteners include, but are not limited to, bolts, nuts, screws, studs, stand-offs, rivets, rivnuts, and combinations thereof. With bolts, screws, studs, and stand-offs, the fastener will generally have an elongated body, which may optionally include a threaded surface, and also optionally, an adjacent non-threaded surface (or surfaces) and/or the fastener head. The fastener may be of various types, drive types, head styles, diameters, and lengths. Likewise, the fastener may comprise any particular major diameter, minor diameter, pitch diameter, helix angle, thread angle, thread count, thread pitch, and/or number of crests/roots. Combinations of different fasteners may be utilized as well, as will be appreciated from the description herein. Suitable fasteners for preparing the composite fasteners of the present invention are commercially available from a large number of suppliers. However, fasteners are but one specific embodiment of the article.

The composite article further comprises a thermally expandable composition disposed on the surface of the article. It is to be appreciated that the term "disposed on," is not to be construed as limiting the composite article in any way, such as by limiting the composite article to a particular configuration or method of manufacture (i.e., introducing the thermally expandable composition to the surface of the article, or introducing the surface of the article to the thermally expandable composition). Furthermore, the thermally expandable composition may be disposed on any portion(s) of the surface of the article, as will be understood by those of skill in the art. For example, the thermally expandable composition may be disposed on only a portion of the surface of the article. As such, the term "composite" extends to, for example, the thermally expandable composition coating or enveloping the entire article or the entire surface of the article, but does not require such extensive coating/enveloping.

The thermally expandable composition may be disposed on a portion, a minority, a majority, or an entirety, of the surface of the article. Likewise, the composite article may comprise the thermally expandable composition disposed on any combination of portions of the article, such as on an adjacent smooth or non-threaded surface(s) thereof. In some embodiments, the surface of the article comprises the conventional plating and/or coating, and the thermally expandable composition is disposed on or adjacent the conventional plating and/or coating.

The composite article may comprise the thermally expandable composition in any amount. As such, the average thickness of the thermally expandable composition on the composite article may be uniform or may vary.

Typically, the thermally expandable composition is present in the composite article in a solid or semi-solid form. As will be described in further detail below, the solid or semi-solid thermally expandable composition may be of any shape and dimension, which are each typically selected based on the particular article utilized and/or the intended use of the composite article. In some embodiments, the composite article comprises the thermally expandable composition as a sleeve disposed about the article, as also described in further detail below.

The thermally expandable composition includes (a) a polyolefin resin.

The term "polyolefin" is meant herein to refer to a homopolymer, copolymer, terpolymer, or mixture thereof, formed from at least one repeating monomer containing olefin functionality. Typically, the (a) polyolefin resin is a homopolymer, copolymer, or terpolymer formed from one or more of ethylene, propylene, butylene, and derivatives thereof. In certain embodiments, the (a) polyolefin resin comprises an ethylene-based polymer. In some embodiments, the (a) polyolefin resin comprises a propylene-based polymer.

In some embodiments, the (a) polyolefin resin comprises a copolymer of an olefin and one or more oxygen-containing compounds, which are typically ethylenically polymerizable and capable of forming a copolymer with the olefin. Examples of such oxygen-containing compounds include acrylic and methacrylic acids, alkyl and hydroxyalkyl esters of acrylic and methacrylic acids (e.g. methyl acrylates, ethyl acrylates, butyl acrylates), vinyl acetates, glycidyl acrylates and methacrylates, vinyl alcohols, and the like. Specific examples of such copolymers suitable for use in or as the (a) polyolefin resin include ethylene-vinyl acetate copolymers, acid-or anhydride-modified ethylene-vinyl acetate copolymers, ethylene-alkyl (meth)acrylate copolymers (e.g. ethylene-methyl acrylate copolymers, ethylene-ethyl acrylate copolymers, and ethylene butyl acrylate copolymers), ethylene-glycidyl (meth)acrylate copolymers, ethylene-glycidyl (meth)acrylate-alkyl acrylate terpolymers, ethylene-vinyl alcohol copolymers, ethylene hydroxyalkyl(meth)acrylate copolymers, ethylene-acrylic acid copolymers, acid- and/or anhydride modified polyethylenes, acid- and/or anhydride-modified poly(methyl methacrylate), and the like. In certain embodiments, the (a) polyolefin resin comprises an acid modified ethylene acrylate resin. In particular embodiments, the (a) polyolefin resin comprises a copolymer of ethylene and methacrylic acid. In some embodiments, the (a) polyolefin resin comprises both a copolymer of ethylene and methacrylic acid and also an acid-modified ethylene acrylate resin In some embodiments, the (a) polyolefin resin comprises a resin selected from the group of ethylene-based acid-modified ethylene/vinyl acetate resins, anhydride-modified ethylene/vinyl acetate resins, acid- and anhydride-modified ethylene/vinyl acetate resins, acid-modified ethylene/acrylate copolymers, anhydride-modified ethylene acrylate copolymers, anhydride-modified HDPE, LLDPE, LDPE and polypropylene resins, and combinations thereof. These particular types of polyolefin resins are widely commercially available, such as, for example, those sold under the trade names Bynel®, Nucrel®, and Elvaloy®, commercially available from E. I. du Pont de Nemours and Company of Wilmington, Del., U.S.A. Examples of these polymers particularly suitable for use in or as the (a) polyolefin resin include, specifically, Bynel® CXA 2002 and Nucrel® 599.

In these or other embodiments, the (a) polyolefin resin has a processing temperature in the range of from about 130 to about 285° C.

The (a) polyolefin resin is present in the thermally expandable composition in an amount of from about 35 to about 65, alternatively from about 40 to about 60, alternatively from about 40 to about 55, alternatively from about 40 to about 50, alternatively in an amount of about 45 wt. %, based on the total weight of the thermally expandable composition (i.e., percent by weight).

The thermally expandable composition also includes (b) a thermoplastic resin.

The (b) thermoplastic resin provides the thermally expandable composition with adhesive properties (e.g. adhesion to the surface of the article, self-adhesion), as will be understood by one of skill in the art in view of description herein relating to the thermally expandable composition itself, as well as the methods manufacturing and using the composite article.

The (b) thermoplastic resin is not limited, and may comprise any thermoplastic or combinations of thermoplastics known in the art. Examples of suitable thermoplastics include hydrocarbon resins (e.g. aromatic hydrocarbon resins, aliphatic hydrocarbon resins), polyamide resins, polyester resins, thermoplastic urethanes, polyolefins (e.g. polypropylenes, polyethylenes, etc.) and combinations, modifications, and terpolymers thereof. The (b) thermoplastic resin may also comprise additives and/or other components, such as those known in the art to promote, increase, prevent, or decrease particular properties of the thermally expandable composition such as curing time, shelf-life, stability, and/or adhesion. One specific example of such additives is an adhesion promotor, which may be any type of adhesion promotor known in the art (e.g. an epoxy adhesion promotor). In some embodiments, the (b) thermoplastic resin comprises a petroleum-derived aromatic hydrocarbon resin. Examples of a suitable petroleum-derived aromatic hydrocarbon resins include those under the trade name Picco™, commercially available from Eastman Chemical Company of Kingsport, Tenn., U.S.A. A specific example of such petroleum-derived aromatic hydrocarbon resins is Picco™ 6100.

The (b) thermoplastic resin is present in the thermally expandable composition in an amount of from about 2 to about 15, alternatively from about 3 to about 12, alternatively from about 4 to about 10, alternatively from about 5 to about 8, alternatively from about 6 to about 7, alternatively in an amount of about 6.5 wt. % based on the total weight of the thermally expandable composition (i.e., percent by weight). In at least one embodiment, the (b) thermoplastic resin is present in an amount of about 6.4 wt. % based on the total weight of the thermally expandable composition.

Typically, the (b) thermoplastic resin has a melting and/or softening point which is less than a processing temperature of the (a) polyolefin resin, such that the (b) thermoplastic resin is soft and/or pliable during thermoforming and/or expanding the thermally expandable composition, as described in further detail below. In certain embodiments, the (b) thermoplastic resin has a melting point or softening point within a range of from about 95 to about 120, alternatively from about 95 to about 115, alternatively from about 95 to about 110, alternatively from about 95 to about 105, ° C. (degrees centigrade) according to ASTM E28.

Typically, the (b) thermoplastic resin is not reactive (e.g. does not form chemical bonds) with one or more of components (a), (c), (d), and (e), with components (d), (d) and (e) being introduced below. In certain embodiments, the (b) thermoplastic resin is not reactive with either of the (a) polyolefin resin or component (c).

The thermally expandable composition additionally includes (c) a curing agent suitable for cross-linking the (a) polyolefin resin.

The (c) curing agent is not limited, and may be any curing agent capable of reacting with and/or curing the (a) polyolefin resin. Typically, the (c) curing agent facilitates the cross-linking of the (a) polyolefin resin. As such, it is to be understood that the terms "curing agent" and "cross-linking agent" may be used interchangeably. It is also to be understood that the term "cured" refers to a composition (e.g. the thermally expandable composition) or component (e.g. the (a) polyolefin resin) that has undergone at least some cross-linking, e.g. at an amount of from about 20 to about 100, about 40 to about 100, about 60 to about 100, about 80 to about 100, or about 90 to about 100% of available cure sites. Additionally, the term "uncured" refers to the composition when it has undergone little or no cross-linking. However, it is to be understood that some of the available cure sites in an uncured composition may be cross-linked. Likewise, some of the available cure sites in a cured composition may remain uncross-linked. Thus, the terms "cured" and "uncured" may be understood to be functional and/or descriptive terms. For example, an uncured resin is typically characterized by an increased solubility in organic solvents and an ability to undergo liquid and/or plastic flow at particular temperatures. In contrast, a cured resin is typically characterized by a decreased solubility or insolubility in organic solvents, and/or an absence of liquid and/or plastic flow at the particular temperatures.

Typically, the (c) curing agent is a compound or composition that, either by itself or via one or more degradation and/or decomposition products, facilitates a formation of chemical bonds between molecules of the (a) polyolefin resin. Accordingly, the (c) curing agent may comprise, alternatively consist essentially of, alternative consist of a heat activated cross-linking agent, a pressure activated cross-linking agent, a light activated cross-linking agent, or combinations thereof.

In certain embodiments, the (c) curing agent comprises, alternatively consist essentially of, alternative consists of a heat activated cross-linking agent. It is to be understood that the term "heat activated" is meant herein to describe a cross-linking agent which, under an elevated temperature, reacts very slowly, or does not react at all, with the (a) polyolefin resin. Additionally, at and above the elevated temperature, the heat activated cross-linking agent reacts expediently, or an increased rate over ambient conditions, with the (a) polyolefin resin to cause the (a) polyolefin resin to undergo cross-linking reactions.

There are several possible mechanisms through which the heat-activated properties of the (c) curing agent can be achieved, which are to be understood in view of the following general description as well as the particular examples described further below. For example, in some embodiments, the (c) curing agent is relatively stable at lower temperatures, but decomposes at the elevated temperature to generate reactive species which form the chemical bonds between molecules of the (a) polyolefin resin (i.e., cross-links). Alternatively, the (c) curing agent may be a solid and therefore relatively unreactive at temperatures below the elevated temperature, but which melts at the elevated temperature to form an active curing agent. Similarly, the (c) curing agent may be encapsulated in a substance that melts, degrades, and/or ruptures at or above the elevated temperature. Likewise, the (c) curing agent be blocked with a labile blocking agent that prevents decomposition/degradation/and/or reaction(s) with the (a) polyolefin resin, which deblocks at or above the elevated temperature. The (c) curing agent may also require the presence of a catalyst or free-radical initiator to complete the curing reaction. In such a case, heat activation may be accomplished by including in the composition a catalyst or free radical initiator that becomes active within the aforementioned temperature ranges.

Typically, the elevated temperature is in the range of from about 140 to about 228° C. For example, in some embodiments, the (c) curing agent is activated at an elevated temperature in the range of from about 130 to about 210, alternatively from about 130 to about 190, alternatively from about 130 to about 185, alternatively from about 130 to about 170, alternatively from about 140 to about 170° C. In particular embodiments, (c) curing agent is activated at an elevated temperature in the range of from about 140 to about 185° C. In certain embodiments, the elevated temperature is the same as an activation temperature of the (e) chemical blowing agent, as described in further detail below.

Accordingly, as will be appreciated by those of skill in the art, the (c) curing agent is typically selected based on the particular (a) polyolefin resin utilized in the thermally expandable composition, and/or the intended use of the thermally expandable composition. Examples of suitable curing agents include peroxides (e.g. organic and/or inorganic), peroxyesters, peroxycarbonates, poly(sulfonyl azides), phenols, azides, aldehyde-amine reaction products, ureas, guanidines, xanthates, dithiocarbamates, sulfur-containing compounds (e.g. thiazoles, imidazoles, sulfenamides, thiuramidisulfides, paraquinonedioxime, dibenzoparaquinonedioxime, and the like), and combinations thereof.

In certain embodiments, the (c) curing agent is organic peroxy compound, such as an organic peroxide, organic peroxyester or organic peroxycarbonate. Examples of suitable organic peroxy compounds include n-butyl-4,4'-di(tert-butylperoxy) valerate, t-butyl peroxyisopropylcarbonate, t-butyl peroxylaurate, 2,5-dimethyl-2,5-di(benzoyloxy) hexane, t-butyl peroxyacetate, di-t-butyl diperoxyphthalate, t-butyl peroxymaleic acid, cyclohexanone peroxide, t-butyl diperoxybenzoate, dicumyl peroxide, 2,5-dimethyl-2,5-di(t-butylperoxy)hexane, t-butylcumyl peroxide, t-butyl hydroperoxide, di-t-butyl peroxide, 1,3-di(t-butylperoxyisopropyl) benzene, 2,5-dimethyl-2,5-di-t-butylperoxy)hexyne-3, di-isopropylbenzene hydroperoxide, p-methane hydroperoxide, dicumyl peroxide, and 2,5-dimethylhexane-2,5-dihydroperoxide. Particular examples of suitable organic peroxy compounds for use in or as the (c) curing agent include those sold under the trade name Luperox®, commercially available from Arkema Inc. of Colombus, France. In certain embodiments, the (c) curing agent is a n-butyl-4,4'-di(tert-butylperoxy) valerate, such as those sold under the trade name Luperox® 230XL.

The amount of the (c) curing agent in the thermally expandable composition is selected to induce a degree of cross-linking of the (a) polyolefin resin at the elevated temperature, as described above. As such, the (c) curing agent is present in the thermally expandable composition in an amount sufficient to cure the (a) polyolefin resin, e.g. in an amount of from about 1 to about 6, alternatively from about 2 to about 5, alternatively from about 3 to about 4, alternatively from about 3.1 to about 3.9, alternatively from about 3.2 to about 3.8, alternatively from about 3.3 to about 3.7, alternatively in an amount of about 3.5, 3.6, or 3.7 wt. % based on the total weight of the thermally expandable composition.

The thermally expandable composition further includes (d) filler.

The (d) filler may be any filler suitable for use in a thermally expandable composition. Typically, the (d) filler is selected based on the particular components selected for use as components (a)-(c), and (e) of the thermally expandable composition. Furthermore, the (d) filler is typically thermally stable at the elevated temperature of component (c) and the activation temperature of component (e), as described herein.

Suitable fillers for use in or as the (d) filler in the thermally expandable composition include extending fillers and/or reinforcing fillers. Particulate materials and fibrous materials or fibers are each within the scope of such fillers. Moreover, suitable fillers for use in or as the (d) filler may have a variety of particle sizes, e.g. from dust-like particles to coarse-grain particles to elongated fibers. Fillers may be inorganic and/or organic. Examples of fillers in particulate forms suitable for use in or as the (d) filler include clays, chalks, talcum powders, metal carbonates, silicates, silicas, oxides, hydroxides, salts, and combinations thereof. Examples of fillers in fibrous forms suitable for use in or as the (d) filler include boron fibers; glass fibers; carbon fibers; silica fibers; ceramic fibers; basalt fibers; aramid fibers; polyester fibers; nylon fibers; polyethylene fibers; and natural fibers, such as wood fibers, flax fibers, hemp fibers, and sisal fibers.

Specific examples of suitable fillers include calcium carbonate ($CaCO_3$), talc ($Mg_3Si_4O_{10}(OH)_2$), wollastonite ($CaSiO_3$), mica muscovite ($KAl_2(Si_3AlO_{10})(OH)_2$), phlogopite ($KMg_3(AlSi_3O_{10})(OH)_2$), aluminium trihydrate ($Al(OH)_3$), magnesium hydroxide ($Mg(OH)_2$), huntite/hydromagnesite ($Mg_3Ca(CO_3)_4/Mg_5(CO_3)_4(OH)_2 \cdot 4H_2O$), barium sulfate (e.g. Barite or Blanc Fixe) ($BaSO_4$), magnetite ($Fe_3O_4$), Dolomite ($CaCO_3.MgCO_3$), magnesium oxysulfate ($5Mg(OH)_2.MgSO_4.3H_2O$), halloysite ($Al_2Si_2O_5(OH)_4$), silsesquioxanes, titanium dioxide; zinc oxide; graphite; glass particles (e.g. glass beads), nanoscale fillers (e.g. carbon nanotubes), carbon black, phyllosilicates, aluminum oxide ("$Al_2O_3$"), titanium dioxide ("$TiO_2$"), graphene, silicon dioxide ("$SiO_2$"), silsesquioxanes, ferrites, and combinations thereof. Nanoscale fillers typically have at least one dimension of less than 100 nanometers (nm). In particular embodiments, the (d) filler comprises calcium carbonate. In certain embodiments, the (d) filler comprises carbon black. In some embodiments, the (d) filler comprises both calcium carbonate and carbon black.

The (d) filler is typically present in the thermally expandable composition in an amount of from about 15 to about 45, alternatively from about 20 to about 40, alternatively from about 25 to about 35, alternatively in an amount of about 30, 31, 32, 33, 34, or 35 wt. %, based on the total weight of the thermally expandable composition.

The thermally expandable composition also includes (e) a chemical blowing agent.

The (e) chemical blowing agent is typically heat-activated, such that at an activation temperature, the (e) chemical blowing agent releases gas and thereby expands (e.g. by blowing and/or foaming) the thermally expandable composition. The (e) chemical blowing agent may release gas through any mechanism, such as via reaction or decomposition.

Typically, the (e) chemical blowing agent is a nitrogen blowing agent, which releases nitrogen or ammonia gas at the activation temperature. General examples of suitable nitrogen blowing agents include azos, hydrazides, carbazides, nitrosos, and combinations thereof. Specific examples of suitable chemical blowing agents include azobisisobutyronitrile, azodicarbonamide, p-toluenesulfonyl hydrazide, oxybissulfohydrazide, 5-phenyl tetrazol, benzoylsulfohydroazide, p-toluolsulfonylsemicarbazide, 4,4'-oxybis(benzensulfonyl hydrazide), and the like, and combinations thereof. Particular examples of chemical blowing agents suitable for use in or as the (e) chemical blowing agent include those commercially available under the trade name Celogen® from CelChem LLC, of Baton Rouge, La., U.S.A. In certain embodiments, the (e) chemical blowing agent is a 4,4'-oxybis(benzensulfonyl hydrazide), such as those sold under the trade name Celogen® OT.

Other suitable type of chemical blowing agents are those which decompose at elevated temperatures to release carbon dioxide, such as sodium hydrogen carbonate, sodium carbonate, ammonium hydrogen carbonate, ammonium carbonate, and the like, as well as combinations and citrates thereof. In certain embodiments, the (e) chemical blowing agent comprises, alternatively is a carbon dioxide blowing agent.

Typically, the (e) chemical blowing agent is selected based on the particular components selected for use as components (a)-(d) of the thermally expandable composition. In some embodiments, the (e) chemical blowing agent is selected such that the activation temperature of the (e) chemical blowing agent is within 40, alternatively within 30, alternatively within 20, alternatively within 10° C. of the elevated temperature of the (c) curing agent. However, it is to be appreciated that the (c) curing agent and the (e) chemical blowing agent may be independently selected.

As introduced above, the term "activation temperature" is to be understood to refer to the temperature at or above which the (e) chemical blowing agent releases gas and thereby expands (e.g. by blowing and/or foaming) the thermally expandable composition. As such, it is also to be understood that the activation temperature may refer to the lowest temperature in a range of temperatures at which the (e) chemical blowing agent begins to release gas. It is also to be understood that the (e) chemical blowing agent may comprise any number of chemical blowing agents, each having an activation temperature that is the same or different from each other chemical blowing agent. Accordingly, description of the activation temperature herein may refer to the activation temperature of any one or more particular chemical blowing agent, but may also apply the (e) chemical blowing agent as a whole.

Typically, the (e) chemical blowing agent is activated at an activation temperature in the range of from about 140 to about 228° C. For example, in some embodiments, the (e) chemical blowing agent is activated at an activation temperature in the range of from about 142 to about 220, alternatively from about 142 to about 215, alternatively from about 150 to about 215, alternatively from about 150 to about 210, alternatively from about 150 to about 180, alternatively from about 150 to about 180, alternatively from about 150 to about 170, alternatively from about 150 to about 160° C. In particular embodiments, the (e) chemical blowing agent is activated at an activation temperature in the range of from about 153 to about 167° C.

The (e) chemical blowing agent is typically present in the thermally expandable composition in an amount of from about 1 to about 10, alternatively from about 2 to about 9, alternatively from about 3 to about 8, alternatively in an amount of about 3.5, 4, 4.5, 5, 5.5, 6, 6.5, or 7 wt. %, based on the total weight of the thermally expandable composition.

In additional to components (a)-(e), the thermally expandable composition may optionally comprise additional components (i.e., additives), such as processing oils (e.g. para 300), accelerators (e.g. maleimides), antioxidants, pigments, flow modifiers, gloss modifiers, extenders, catalysts, and hardeners.

Any of these additives may be present in the thermally expandable composition in various amounts. If present, the additives are typically utilized in a collective amount of from greater than 0 to about 15, alternatively from greater than 0 to about 12, alternatively from greater than 0 to about 10, alternatively from greater than 0 to about 8, alternatively from greater than 0 to about 6, alternatively from greater than 0 to about 5 wt. %, based on the total weight of the thermally expandable composition. In various embodiments, at least one additive is present in an amount of at least about 0.001 to about 5, alternatively from about 0.01 to about 4, alternatively from about 0.1 to about 3, alternatively from about 0.1 to about 1 wt. %, based on the total weight of the thermally expandable composition.

The processing oil may be any processing oil, as will be understood by one of skill in the art. In some embodiments, the thermally expandable composition comprises para 300 processing oil. Likewise, the accelerator may be any accelerator suitable for use in a thermally expandable composition. In certain embodiments, the thermally expandable composition comprises a m-phenylenedimaleimide accelerator, such as one of those sold under the trade name Vanax® by R. T. Vanderbilt of Norwalk, Conn., U.S.A.

General examples of antioxidants include phenolic types, organic phosphites, phosphines and phosphonites, hindered amines, organic amines, organo sulfur compounds, lactones and hydroxylamine compounds. Specific examples of antioxidants include tetrakis methylene (3,5-di-t-butyl-4-hydroxyhydrocinnamate) methane, octadecyl 3,5-di-t-butyl-4-hydroxyhydrocinnamate, 1,3,5-tris(3,5-di-t-butyl-4-hydroxybenzyl)-s-triazine-2,4,6-(1H, 3H, 5H) trione, 1,1,3-tris(2'methyl-4'hydroxy-5't-butylphenyl)butane, octadecyl-3-(3',5'-di-t-butyl-4'-hydroxyphenyl)propionate, 3,5-bis(1,1-dimethylethyl)-4-hydroxybenzene propionic acid C13-15 alkyl esters, N,N-hexamethylene bis(3,5-di-t-butyl-4-hydroxyphenyl)propionamide, 2,6-di-t-butyl-4-methylphenol, bis[3,3-bis-(4'hydroxy-3't-butylphenyl)butanoic acid] glycol ester (Hostanox O3 from Clariant), bis(2,4-dicumylphenyl) pentaerythritol diphosphite, tris(2,4-di-tert-butylphenyl) phosphite, distearyl pentaerythritol diphosphite, bis-(2,4-di-t-butylphenyl)-pentaerythritol diphosphate, bis-(2,4-di-t-butyl-phenyl)-pentaerythritol-diphosphite, trisnonylphenol phosphite, triphenyl phosphite, diphenyl phosphite, phenyl diisodecyl phosphite, diphenyl isodecyl phosphite, diphenyl isooctyl phosphite, tetraphenyl dipropyleneglycol diphosphite, poly(dipropyleneglycol) phenyl phosphite, alkyl (C10-C15) bisphenol A phosphite, triisodecyl phosphite, tris(tridecyl) phosphite, trilauryl phosphite, tris(dipropylene glycol) phosphite, dioleyl hydrogen phosphite, 1,3 bis-(diphenylphospino)-2,2-dimethylpropane, thiodiethylene bis[3-(3,5-di-t-butyl-4-hydroxyphenyl)proprionate], octylated diphenylamine, polymers of 2,2,4,4-tetramethyl-7-oxa-3,20-diaza-dispiro[5.1.11.2]-heneicosan-21-on, 1,6-hexaneamine, N,N'-bis(2,2,6,6-tetramethyl-4-piperidinyl)-, polymers of morpholine-2,4,6-trichloro-1,3,5-triazine, poly-R6-(1,1,3,3-tetramethylbutyl)amino]-s-triazine-2,4-diyl][2,2,6,6-tetramethyl-4-piperidyl)imino]hexamethylene[(2,2,6,6-tetramethyl-4-piperidyl)imino]], 1,3,5-triazine-2,4,6-triamine-N,N''''-[1,2-ethanediylbis[[[4,6-bis[butyl-(1,2,2,6,6-pentamethyl-4piperidinyl)amino]-1,3,5-triazine-2yl] imino]-3,1-propanediyl]]bis-[N',N''-dibutyl-N',N''-bis(1,2,2,6,6-pentamethyl-4-piperidinyl), and the like, and combinations thereof.

The present invention also provides a method of preparing the composite article. The composite article may be prepared via any suitable technique, which is generally contingent on the composite article itself. For example, the thermally expandable composition may be disposed onto the surface of the article to give the composite article.

In certain embodiments, the method comprises thermoforming the thermally expandable composition at a first elevated temperature less than the activation temperature of the chemical blowing agent. By thermoforming, it is meant that the thermally expandable composition is formed at a first elevated temperature, which is less than the activation temperature of the chemical blowing agent. This allows preparation of the thermally expandable composition without activating or decomposing the chemical blowing agent prematurely. The first elevated temperature may be any suitable temperature that is less than the activation temperature of the chemical blowing agent. In certain embodiments, the first elevated temperature is selected such that it allows homogenous, alternatively substantially homogenous, mixing of the components of the thermally expandable composition. For example, the first elevated temperature may be selected such that at least the (b) thermoplastic resin softens or melts, thereby allowing the components to disperse and compound with at least the (b) thermoplastic resin.

Typically, the first elevated temperature is less than the elevated temperature at which the (c) curing agent is activated. Accordingly, in some embodiments, the method comprises thermoforming the thermally expandable composition at a temperature less than a temperature that activates the (c) curing agent and initiates crosslinking of the (a) polyolefin resin.

In certain embodiments, the first elevated temperature is from greater than 35 to 115, alternatively from 40 to 110, alternatively from 45 to 105, alternatively from 50 to 100, alternatively from 55 to 95, alternatively from 60 to 90, alternatively from 65 to 88, alternatively from 70 to 85, alternatively 80° C. However, the first elevated temperature may vary from these ranges depending on a selection of components within the thermally expandable composition, including any relevant softening or melting point temperatures, as well as the selection of the chemical blowing agent and its activation temperature.

Thermoforming the thermally expandable composition may be carried out in any suitable thermoforming equipment. In certain embodiments, the thermally expandable composition is thermoformed, compounded, and pelletized. Once in pelletized form, the thermally expandable composition may be further processed as desired, e.g. extruded.

In certain embodiments, the method further comprises extruding the thermally expandable composition. The thermally expandable composition may be thermoformed in the extruder itself such that thermoforming the thermally expandable composition comprises extruding the thermally expandable composition. Typically, however, the thermally expandable composition is formed by thermoforming and pelletized to give the thermally expandable composition in pelletized form. The pelletized form of the thermally expandable composition is then fed to an extruder and extruded to modify the shape of the thermally expandable composition.

In specific embodiments, extruding the thermally expandable composition comprises extruding the thermally expandable composition over a mandrel. In these embodiments, the thermally expandable composition is a tube extending between first and second ends and defining a cavity also extending between the first and second ends.

The dimensions of the tube, including a length of the tube extending between the first and second ends, as well as a diameter of the cavity, may vary and may be uniform and/or non-uniform, continuous and/or discontinuous, etc. The tube of the thermally expandable composition is typically in solid form and is not tacky such that it can be easily handled and manipulated.

Typically, the thermally expandable composition is extruded over a mandrel when the article comprises the fastener. In these embodiments, the elongated body of the fastener generally corresponds in cross-sectional shape and diameter to the cavity defined by the tube of the thermally expandable composition. In such embodiments, disposing the thermally expandable composition comprises disposing the elongated body through the cavity such that the thermally expandable composition is disposed at least partially circumferentially about the elongated body.

During and after extrusion, the tube of the thermally expandable composition has a length. The tube can be cute incrementally at any interval to give a desired size, shape and configuration of the tube. Typically, the tube is cut parallel to the first and second ends such that, once cut, the thermally expandable composition is in the shape of a ring. The ring is distinguished from the tube by virtue of it having a lesser length.

The tube, and the ring, of the thermally expandable composition has an outer diameter and an inner diameter defining the cavity. The outer and inner diameters may be uniform and/or non-uniform, continuous and/or discontinuous, etc. The tube, and the ring, has a thickness between the outer and inner diameter. The thickness may be any thickness and is typically selected during extrusion depending on dimensions of the article or fastener, end use applications of the composite article, etc. The tube, and the ring, of the thermally expandable composition may be referred to as a sleeve.

The elongated body of the fastener typically is cylindrical and has an outer diameter and a length. The outer diameter of the elongated body of the fastener typically corresponds to the inner diameter of the ring of the thermally expandable composition. That way, the elongated body of the fastener may be disposed through the inner diameter, or the cavity, defined by the ring. The ring of the thermally expandable composition is generally disposed at least partially circumferentially about the elongated body. For example, the ring may be discontinuous such that once disposed over the elongated body of the fastener the ring defines a gap in one or more portions thereof. In specific embodiments, the ring of the thermally expandable composition is disposed circumferentially about the outer diameter of the elongated body.

The inner diameter of the ring of the thermally expandable composition may be less than the outer diameter of the elongated body of the fastener. In these embodiments, the ring of the thermally expandable composition is typically elastic and can be disposed over the elongated body with force. In these embodiments, the ring of the thermally expandable composition is in contact with the elongated body of the thermally expandable composition. In other embodiments, the inner diameter of the ring is greater than the outer diameter of the elongated body of the fastener. In these embodiments, the ring of the thermally expandable composition may contact portions of the elongated body of the fastener, or may be spaced from the elongated body of the fastener. For example, the ring of the thermally expandable composition may be moveable along the elongated body of the fastener. The ring of the thermally expandable composition may be maintained in place via the head of the fastener, and/or may be adhered to the elongated body.

The thermally expandable composition may be applied immediately prior to use of the coated article, e.g. by a customer or end user. Alternatively, the thermally expandable composition may be applied to the article to give the composite article, e.g. the composite fastener, and subsequently shipped or stored as a "pre-applied" thermally expandable composition and composite article.

If desired, an underlying coating may be applied to a portion, a majority, or an entirety of the article, or any portion of the fastener (e.g. the elongated body) prior to applying the thermally expandable composition such that the thermally expandable composition does not directly contact the surface of the article, but instead is adjacent the surface of the article (e.g. the elongated body of the fastener). Typically, however, the thermally expandable composition is applied directly to the surface of the article.

Alternatively or in addition, one or more compositions or layers may be applied on the thermally expandable composition. For example, the thermally expandable composition may be applied to the surface of the article to form a base coat layer, and a second composition may be applied on the base coat layer to form a top coat layer. The second composition may be the same as or different from the thermally expandable composition. Typically, the second composition is different from the thermally expandable composition such that a layered structure results. The second composition is typically flowable and may be applied via wet coating techniques. When the base coat and top coat layers are utilized, the layers are typically applied "wet-on-dry." As used herein, the article including at least the thermally expandable composition and optionally the second composition is also referred to as the composite article.

The second composition, when different from the thermally expandable composition, may be selected based on desired properties of the composite article. For example, the second composition may be utilized to increase a shelf life of the composite article, increase durability of the underlying thermally expandable composition (e.g. via encapsulation by the second composition), modify a coefficient of friction, etc.

Use of the second composition may be useful for assisting the thermally expandable composition in wetting out the threaded surface of the fastener during application, e.g. by further wetting out the thermally expandable composition and thus the threaded surface. This is especially true with threaded surfaces having small thread pitches. Moreover, the second composition may prevent bridging of the thermally expandable composition during application and/or cure, where the thermally expandable composition may separate from (or be spaced from) roots of the threaded surface and merely sit across crests of the threaded surface, which can decrease adhesion.

The present invention also provides a method of adjoining adjacent elements with the composite article. The method comprises disposing the composite article adjacent and/or through the adjacent elements. The method further comprises heating the composite article at the activation temperature of the (e) chemical blowing agent, thereby expanding the thermally expandable composition and adjoining the adjacent elements. It is to be understood that heating the composite article at the activation temperature of the (e) chemical blowing agent is not limited to heating at any single temperature, but rather refers to heating the composite article at a temperature that is at least equal to, but which may be greater than, the activation temperature of the (e) chemical blowing agent. Accordingly, heating the composite article at the activation temperature of the (e) chemical blowing agent may comprise heating the composite article at any number of particular temperatures, or ranges of temperatures, so long as the thermally expandable composition is exposed to and/or reaches a temperature that is equal to or greater than the activation temperature of the (e) chemical blowing agent, as described in further detail below. For example, heating the composite article at the activation temperature of the (e) chemical blowing agent may comprise exposing the composite article to a steady temperature that is equal to or greater than the activation temperature, or alternatively may comprise dynamic heating of the composite article.

Once the composite article is heated at the activation temperature of the (e) chemical blowing agent, an expanded composite article results. The thermally expandable composition expands at the activation temperature to fill any voids and otherwise solidify in place the composite article and the adjoined adjacent elements, which may be referred to as an assembly. The expanded composite article has a larger volume than the composite article due to expansion and/or foaming of the thermally expandable composition. The amount of expansion may be influenced by selection and relative amounts of the components in the thermally expandable composition.

Typically, heating the composite article at the activation temperature of the (e) chemical blowing agent also comprises heating the thermally expandable composition at the elevated temperature of the (c) curing agent, such that the (c) curing agent crosslinks the (a) polyolefin resin of the thermally expandable composition. As such, the expanded composite article is the reaction product of the composite article.

The assembly is also provided by the present invention.

The elements are not limited, and may be any joinable elements known in the art. Furthermore, any number of elements, e.g. three or more, may be joined in accordance with the present invention. Each of the elements may be the same as or different than one another. As such, each element may be independently selected, typically based on the intended use of the adjoined elements. In view of the above, it is to be understood that reference to "the element" herein may refer to any one or more of the elements being adjoined.

The elements may be independently formed from any conventional material(s), such as metal, wood, plastic, ceramic, glass, and the like, or combinations thereof. Typically, the elements comprise metal. The metal is not limited, and may be any metal. Typically, the metal is selected to provide the element with strength, rigidity, and/or durability. Specific examples of suitable metals include iron, brass, bronze, titanium, aluminum, magnesium, tungsten, molybdenum, manganese, chromium, nickel, and the like, or a combination or alloy thereof. In some embodiments, the metal is an alloy. Examples of suitable alloys include steels, such as carbon steels, alloy steels, stainless steels, and the like, and combinations thereof. Generally, each element comprises a metal different (e.g. of a different composition and/or electrode potential) than the metal of the composite article such that, in the absence of the thermally expandable composition, one of the metals would corrode when in contact with the other. Each element may further comprise a conventional plating and/or coating, such as those coatings described herein. Each of the elements may be formed from one type of metal and further comprise the conventional plating and/or coating comprising another type of metal. Alternatively, each of the elements may be a "virgin" or "bright" article (i.e., it may lack plating/coating).

Each element may be of any particular shape, size, or design. Typically, each element is shaped to be joined to the composite article, and optionally to another element. In some embodiments, each element defines an aperture.

The composite article may be disposed adjacent and/or through the adjacent elements using any technique known in the art, which may be performed manually, mechanically, pneumatically, hydraulically, gravitationally, and the like, or combinations thereof.

Typically, the adjoining elements each define an aperture, and the composite article, or the composite fastener, is disposed through the apertures of the adjoining elements, which are typically aligned. The adjoining elements are not limited. In certain embodiments, the composite article is utilized to adjoin and seal automotive components, e.g. a battery enclosure, for electric vehicles.

Additional types of suitable fasteners, additives, secondary components (e.g. platings/coatings), methods of manufacture (e.g. coating techniques), and/or uses (e.g. element fastening), are described in United States ("U.S.") Pat. Nos. 5,426,130; 5,651,824; 5,656,325; 5,672,376; 5,679,160; 5,928,711; 5,964,551; 6,027,568; 6,270,838; 6,322,628; 6,474,919; 6,817,816; 7,404,483; 7,521,402; 7,771,148; 7,772,316; 7,878,744; 8,865,794; and 8,865,812; US Publication Nos. 2008/292426; 2014/0199135; 2015/0014126; 2015/0056394 and 2015/0232692; International Application No. PCT/US2015/045979; and International Publication Nos. WO1999066219; WO2008073262; WO2008094535; WO2008094537; WO2008153866; and WO2008153868; the disclosures of which are hereby incorporated by reference in their entirety.

INDUSTRIAL APPLICABILITY

While the present invention is not limited to a particular end application, use or industry, industrial and automotive equipment manufacturers often rely on composite articles to prevent critical parts from failing. The thermally expandable composition has excellent physical properties, including adhesion to and uniform coverage of a variety of substrates and high temperature resistance. The thermally expandable composition provides a barrier between two metal surfaces that inhibits the metal surfaces from coming into contact with one another. The thermally expandable composition inhibits aluminum corrosion which results from the use of steel fasteners for joining an aluminum part.

The following example is intended to illustrate the present invention and is not to be viewed in any way as limiting to the scope of the present invention.

EXAMPLE

The following examples are intended to illustrate the present invention and are not to be viewed in any way as limiting to the scope of the present invention.

Example 1

A thermally expandable composition is prepared in accordance with the present invention. The components and amounts thereof utilized to prepare the thermally expandable composition are set forth below in Table 1.

TABLE 1

| Component | wt. % |
| --- | --- |
| (a) Polyolefin Resin 1 | 28.09 |
| (a) Polyolefin Resin 2 | 18.72 |
| (b) Thermoplastic Resin | 6.37 |
| (c) Curing Agent | 3.58 |

TABLE 1-continued

| Component | wt. % |
| --- | --- |
| (d) Filler 1 | 32.76 |
| (d) Filler 2 | 1.04 |
| (e) Chemical Blowing Agent | 5.09 |
| Additive 1 | 3.75 |
| Additive 2 | 0.61 |

(a) Polyolefin Resin 1 is a copolymer of ethylene and methacrylic acid made with nominally 10% methacrylic acid.
(a) Polyolefin Resin 2 is an acid modified ethylene acrylate resin (ethylene terpolymer containing a temperature stable ester in combination with high acid functionality).
(b) Thermoplastic Resin is a thermoplastic resin produced from petroleum derived aromatic monomers.
(c) Curing Agent is n-butyl-4,4'-di(tert-butylperoxy) valerate on $CaCO_3/SiO_2$.
(d) Filler 1 is Calcium Carbonate, Q-325 Mesh
(d) Filler 2 is Carbon Black
(e) Chemical Blowing Agent is 4,4'-oxybis(benzensulfonyl hydrazide).
Additive 1 is a processing oil
Additive 2 is a m-phenylenedimaleimide accelerator.

The thermally expandable composition prepared above is thermoformed (mandrel extrusion) at a first elevated temperature (77° C. (170° F.)) to form a tube of the thermally expandable composition. The tube of the thermally expandable composition extends between first and second ends and defines a cavity that also extends between the first and second ends. The tube is then cut parallel to the first and second ends to form a ring of the thermally expandable composition. The ring of the thermally expandable composition is disposed on the surface (elongated body) of an article (fastener) to give a composite article.

The composite article prepared above is disposed through adjacent elements, and then heated at an activation temperature (149° C., (300° F.)) of the chemical blowing agent to give the expanded composite article and adjoin the adjacent elements.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A composite article, comprising:
   a fastener comprising: an elongated body presenting a surface;
   a head joined with the elongated body and
   a thermally expandable composition disposed at least partially circumferentially about the elongated body, the thermally expandable composition comprising:
   (a) from about 45 to about 65 percent by weight of a copolymer of ethylene and methacrylic acid and an acid-modified ethylene acrylate resin;
   (b) from about 2 to about 15 percent by weight of a thermoplastic resin;
   (c) from about 1 to about 6 percent by weight of a curing agent comprising peroxyester for cross-linking the (a) polyolefin resin;
   (d) from about 30 to about 35 percent by weight of filler;
   (e) from about 1 to about 10 percent by weight of a chemical blowing agent comprising 4,4'-oxybis(benzensulfonyl hydrazide), which is activated at activation temperature;
   (f) a processing oil; and
   (g) m-phenylenedimaleimide accelerator; each based on the total weight of the thermally expandable composition.

2. The composite article of claim 1, wherein the thermally expandable composition is disposed circumferentially about the elongated body.

3. The composite article of claim 1, wherein the (a) polyolefin resin has a processing temperature within a range of from about 130 to about 285° C.

4. The composite article of claim 1, wherein the (b) thermoplastic resin: (i) comprises a hydrocarbon resin; (ii) has a softening point within a range of from about 95 to about 120° C. according to ASTM E28: (iii) is nonreactive with components (a) and (c)-(g); or (iv) a combination of (i)-(iii).

5. The composite article of claim 4, wherein the (b) thermoplastic resin comprises the hydrocarbon resin, and the hydrocarbon resin comprises an aromatic hydrocarbon resin.

6. The composite article of claim 1, wherein the (d) filler comprises (i) an organic filler; (ii) an inorganic filler, or (iii) both (i) and (ii).

7. The composite article of claim 6, wherein the (d) filler comprises the organic filler, and the organic filler comprises carbon black.

8. A method of preparing the composite article of claim 1, said method comprising;
   providing the fastener comprising an elongated body presenting a surface, and a head joined with the elongated body;
   thermoforming the thermally expandable composition at a first elevated temperature less than the activation temperature of the chemical blowing agent;
   extruding the thermally expandable composition over a mandrel such that the thermally expandable composition is a tube extending between first and second ends and defining a cavity also extending between the first and second ends;
   disposing the elongated body of the fastener through the cavity such that the thermally expandable composition is disposed at least partially circumferentially about the elongated body.

* * * * *